US008421251B2

(12) United States Patent
Pabon et al.

(10) Patent No.: US 8,421,251 B2

(45) Date of Patent: *Apr. 16, 2013

(54) ENHANCING THE EFFECTIVENESS OF ENERGY HARVESTING FROM FLOWING FLUID

(75) Inventors: Jahir A. Pabon, Newton, MA (US); Giorgia Bettin, Lexington, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 506 days.

This patent is subject to a terminal disclaimer.

(21) Appl. No.: 12/732,517

(22) Filed: Mar. 26, 2010

(65) Prior Publication Data

US 2011/0233936 A1 Sep. 29, 2011

(51) Int. Cl.
*F03G 7/00* (2006.01)

(52) U.S. Cl.
USPC .......................................................... 290/1 R

(58) Field of Classification Search .................. 290/1 R
See application file for complete search history.

(56) References Cited

U.S. PATENT DOCUMENTS 5,839,508 A * 11/1998 Tubel et al. .................. 166/65.1
6,011,346 A * 1/2000 Buchanan et al. ............ 310/339
6,043,995 A 3/2000 Leuthen
6,059,031 A 5/2000 Brett
6,179,056 B1 1/2001 Smith
6,504,258 B2 * 1/2003 Schultz et al. ................ 290/1 R
6,768,214 B2 7/2004 Schultz et al.
6,845,819 B2 1/2005 Barrett et al.
6,854,269 B2 2/2005 Hale
7,114,557 B2 10/2006 Cudmore et al.
7,114,572 B2 10/2006 Batho et al.
7,490,675 B2 2/2009 Hearn
7,560,856 B2 * 7/2009 Chen et al. .................... 310/339
2003/0192598 A1 10/2003 Hobson et al.
2004/0246108 A1 12/2004 Robertson et al.
2005/0230973 A1 10/2005 Fripp et al.
2006/0086498 A1 4/2006 Wetzel et al.
2006/0175064 A1 8/2006 Yuratich
2006/0175838 A1 8/2006 Tipps
2008/0164036 A1 7/2008 Bullen
2008/0277941 A1 11/2008 Bowles et al.
2009/0058091 A1 3/2009 Douglas
2009/0065197 A1 3/2009 Eslinger
2009/0134631 A1 5/2009 Guerrero et al.
2010/0194117 A1 8/2010 Pabon et al.
2010/0308599 A1 12/2010 Pabon et al.

FOREIGN PATENT DOCUMENTS

JP 2006132397 A 5/2006
WO 0155551 8/2001

OTHER PUBLICATIONS

International Search Report and Written Opinion of PCT Application U.S. Appl. No. PCTA/US2011/029767 dated Dec. 7, 2011.

* cited by examiner

*Primary Examiner* — Tho D Ta

(74) *Attorney, Agent, or Firm* — Bridget Laffey; Jakub Michna; Rachel Greene

(57) ABSTRACT

An apparatus and method to enhance the efficiency of an energy harvesting device is disclosed. A modulator module creates fluctuations in the flow at a predetermined frequency or group of frequencies and these fluctuations increase mechanical vibrations which are then harvested by an energy harvesting module.

18 Claims, 8 Drawing Sheets

615
609
601
607, VORTEX SHEDDING
611
613
603
FLUID FLOW, 605
705
703
701
711
709

ENHANCING THE EFFECTIVENESS OF ENERGY HARVESTING FROM FLOWING FLUID

BACKGROUND OF THE INVENTION

1. Field of the Invention

This disclosed subject matter is generally related to harvesting energy, and more particularly to enhancing the efficiency of downhole energy harvesting devices by creating flow fluctuations.

2. Background of the Invention

In order to recover natural resources from subterranean formations it is often necessary to perform tasks related to exploration, monitoring, maintenance and construction in remote locations that are either difficult or impractical for personnel to reach directly. For example, boreholes may be drilled tens of thousands of meters into the earth, and in the case of offshore drilling; the borehole may be thousands of meters under water. One of the technical challenges to performing tasks in such remote locations is providing power to equipment. It is known to power downhole and undersea equipment via stored energy or wireline connection to the surface. However, both of these techniques have disadvantages. For example, a wireline connection to the surface limits that distance at which the equipment can operate relative to the energy source, and may require a relatively significant portion of the limited volume of a borehole. Using stored energy avoids some of the disadvantages of a wireline connection to the surface, but relatively little energy can be stored in comparison to requirements because of size limitations. For example, the available volume in a borehole environment is small. Further, both wireline connections to the surface and stored energy techniques require the presence of operators, e.g. a surface vessel to either provide the wireline energy or recharge the energy storage means.

Various techniques associated with energy production are known. The presently disclosed subject matter addresses the problems of the prior art by enhancing the energy available for harvesting and therefore the energy harvested.

SUMMARY OF THE INVENTION

According to embodiments, a method to enhance the efficiency of an energy harvesting device is disclosed. The method comprises a number of steps which include in one non-limiting example increasing the fluctuations of a fluid flow with a modulator module, with a housing defining an inner volume though which the fluid is permitted to traverse from a first opening to a second opening, generating vibrations in the housing from the increased fluid fluctuations; and harvesting energy upstream from the generated vibrations.

In a further embodiment an apparatus for enhancing the efficiency of an energy harvesting device is disclosed. This apparatus comprises in one non-limiting example a modulator module for increasing fluctuations of a fluid; a housing defining an inner volume though which the fluid is permitted to traverse from a first opening to a second opening, and generating vibrations in the housing from the increased fluid fluctuations which are then harvested from the generated vibrations.

Further features and advantages of the invention will become more readily apparent from the following detailed description when taken in conjunction with the accompanying drawings.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice. Further, like reference numbers and designations in the various drawings indicate like elements.

Embodiments of the present disclosure may be implemented in various different devices for converting kinetic energy from the surrounding environment into electrical energy. The embodiments are described below in the context of the source of kinetic energy being fluid flow through a borehole such as those associated with petrochemical wells. Additionally, it is to be understood that the various embodiments of the present disclosure described herein are not limited to petrochemical wells.

Apparatus and methods are disclosed for enhancing the efficiency of downhole energy harvesting devices. In one embodiment an apparatus and method is disclosed for enhancing the efficiency of downhole energy harvesting devices in reservoir completions that use artificial lift to generate the flow of producing fluid. The efficiency of the downhole energy harvesting device is enhanced by modulating the input power to the artificial lift device. In one non-limiting example the artificial lift device is an electric submersible pump. Modulating the input power to the artificial lift device creates fluctuations in the producing flow at a predetermined frequency or group of frequencies. The amplitude of the flow fluctuations is small enough so as to minimally affect the production. The frequency or frequencies are selected in one non-limiting example in accordance with the frequencies at which energy harvesting devices placed downhole in the reservoir operate at their maximal efficiency and/or generate maximal energy. In one non-limiting example the frequencies are selected to match the resonance frequency or frequencies of one or more energy harvesting devices.

Figure 1:
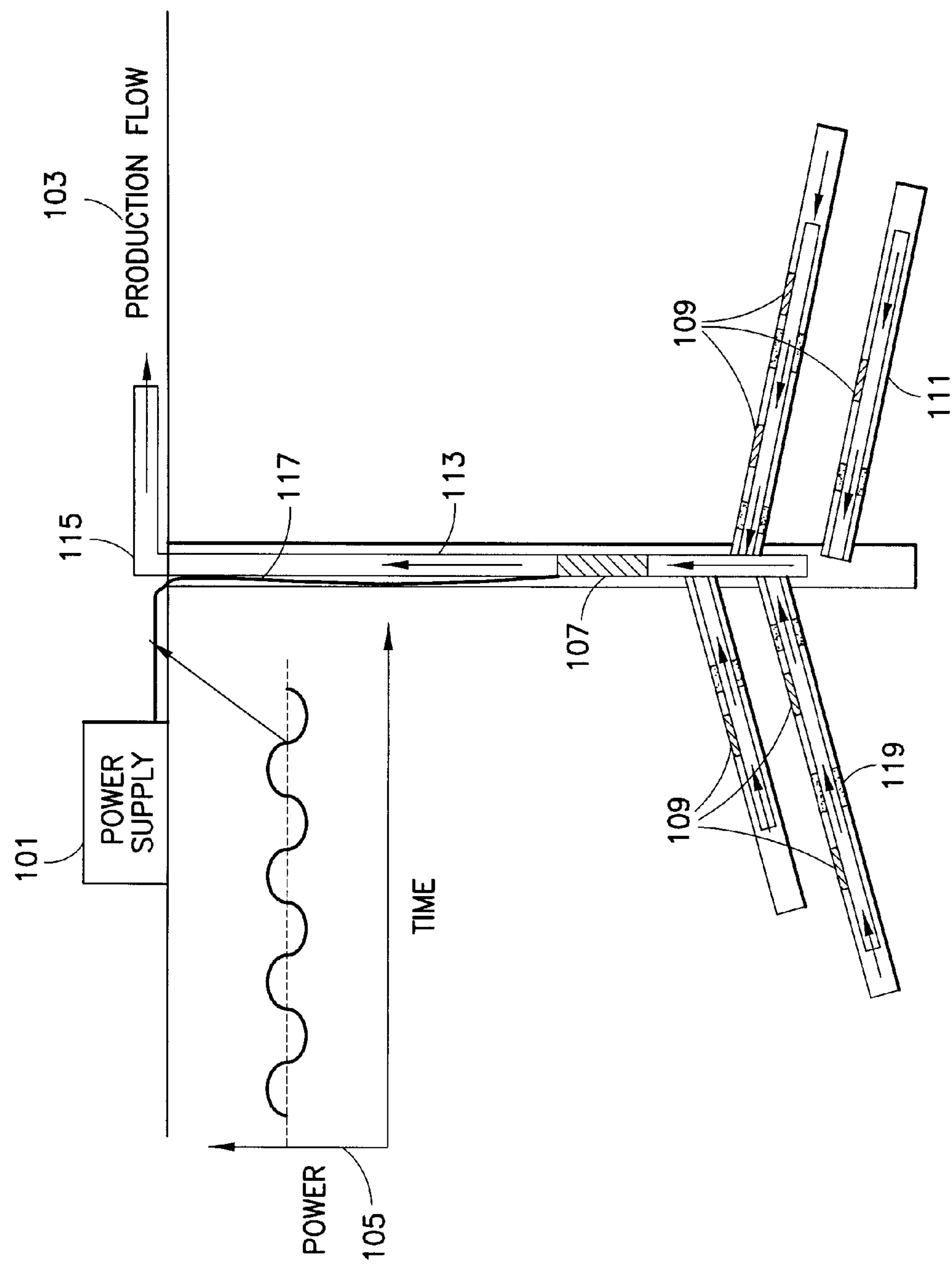
FIG. 1 illustrates a schematic view of an energy harvesting device downhole.

Representatively illustrated in FIG. 1 is a method and apparatus which embodies principles of the present disclosure. The method and apparatus are described herein as being performed in one non-limiting example in conjunction with a producing well in which fluid is produced from a formation 111 into a tubular string 113 to the earths' surface. A downhole module 109 comprises an energy harvesting module. This energy harvesting module converts the kinetic energy of a fluid flow 103 in a borehole 115 into electrical energy. In one non-limiting example the downhole module 109 further comprises a flow monitoring module and a flow control module. In one non-limiting example the flow monitoring module will monitor downhole production conditions, power, temperature, flow and water cut. In one non-limiting example the flow control module may comprise inflow control valves.

In the illustrated embodiment, fluid flows through a cylindrical (tubular) housing 113 having an inlet and outlet. Kinetic energy associated with the fluid flow causes structural vibrations due to flow fluctuations. These structural vibrations are an important source of harvestable energy for downhole power generation. Flow fluctuations can occur in many geometric configurations and in one non-limiting example the end of the production tubing is, in many cases, a cantilever beam geometry. In one non-limiting example fluctuation in the flow is created by oscillating power 101 to a pump 107. In the illustrated embodiment the pump 107 is part of an artificial lift system utilizing an electric submersible pump connected with a control line 117 to a power supply 101. Artificial lift systems are used for moving wellbore fluids. Some wells are capable of producing under naturally induced reservoir pressures but more common are wells that employ some form of an artificial lift production technique. The pump 107 is disposed along the cylindrical (tubular) housing 113 but downstream to most laterals or complex architectural features.

Figure 2:
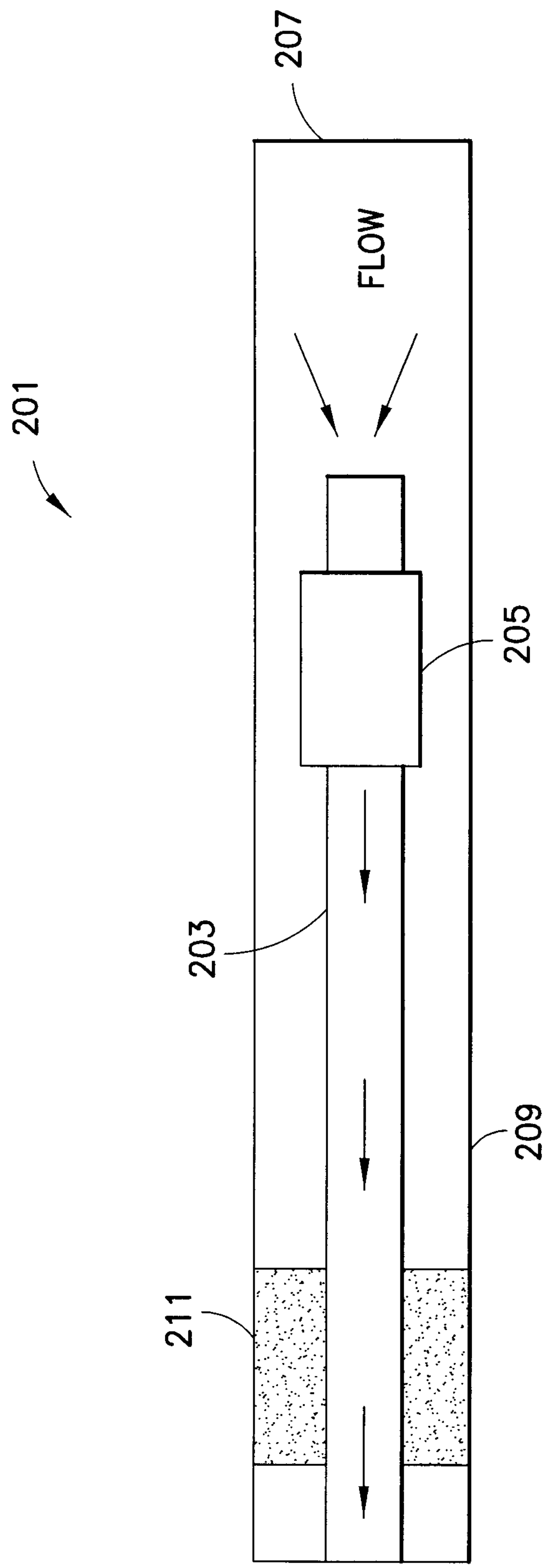
FIG. 2 illustrates a schematic view of an energy harvesting device located at the end of a production tubing.

FIG. 2 illustrates a schematic of a geometry for the end of a production tubing 203. Packers 211 anchor the production tubing 203 to a casing 209 while fluid flows 207 into the production tubing 203 thus creating a cantilever which is free to vibrate. Packer 211 is positioned to seal the annulus between the production tubing 203 and wellbore casing 209. Fluid flows 207 into the production tubing 203 creating flow fluctuations which causes the cantilever to vibrate at a certain frequency. An optimal position for an energy harvester module 205 in one non-limiting example is close to the tip of the production tubing 203 where the amplitude of vibrations is the greatest. The production tubing 203 vibrates at the system natural frequency but the amplitude of oscillations is very small which limits the amount of energy harvestable. Embodiments of the present disclosure enhance the energy available for harvesting and therefore the power produced by modulating the fluid flow to match the frequency of the tubing vibrations. This will increase dramatically the amplitude of the production tubing oscillations.

Figure 3:
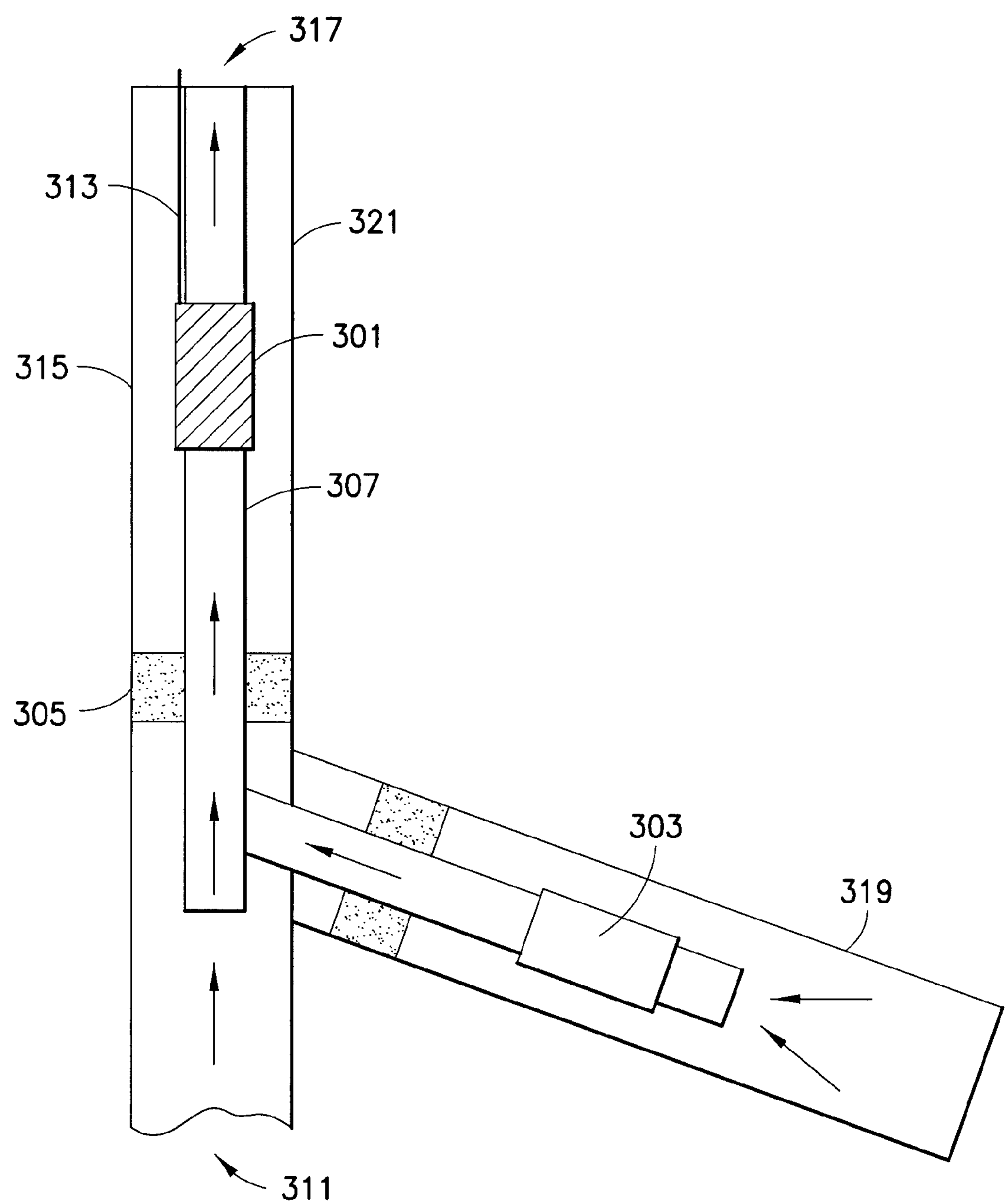
FIG. 3 illustrates a schematic view of an energy harvesting device in a well with artificial lift.

FIG. 3 illustrates one embodiment of the present disclosure. A wellbore 317 is generally illustrated having a primary borehole 321 and a lateral borehole 319. It will be appreciated that additional laterals may exist in an actual wellbore and that this drawing merely illustrates a small portion of the overall wellbore system. Wellbore 317 includes a casing 315 disposed therein. Packer 305 is positioned to seal the annulus between the production tubing 307 and wellbore casing 315. A pump 301 is disposed along the cylindrical (tubular) housing 307 but downstream to the lateral borehole 319. The energy harvester 303 is disposed along the cylindrical (tubular) housing 307. The pump 301 is connected to the power module 101 on the surface via a control line 313. Embodiments of the present disclosure oscillate power from the power module on the surface to the pump 301. These oscillations produce fluctuations in the flow rate which can be felt upstream where no power connection is present e.g. at the energy harvester module 303. These fluctuations can be matched to the natural frequency of the cylindrical (tubular) housing 307 to increase the magnitude of displacement of the cylindrical (tubular) housing 307 thus enhancing the energy available for the energy harvesting module 303 to harvest. The advantages of embodiments of the present disclosure are that a much greater amount of energy can be harvested with very little effect on the overall rate of production.

Figure 4A:
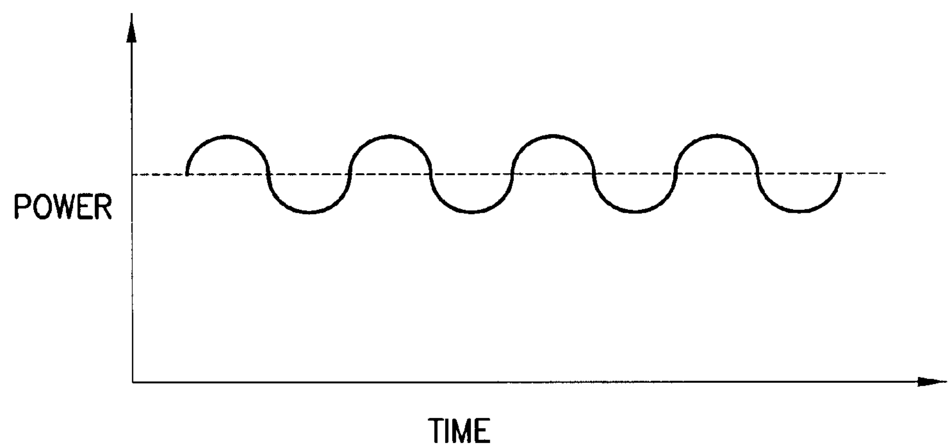
FIG. 4A illustrates a graph of power variation as a function of time and FIG. 4B illustrates a graph of displacement of a production tubing as function of time.
Figure 4B:
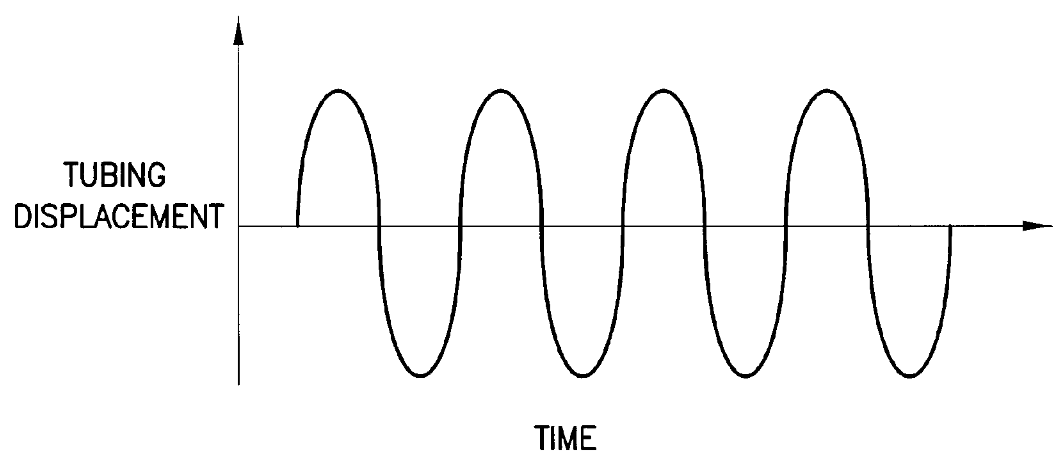

FIG. 4A illustrates a graph of power variation as a function of time. The power module 101 varies power to the pump 301 where the power variation in one non-limiting example is a slight variation and distributed around an average value. The frequency of the variation is matched to the frequency of the instability experienced by the cylindrical (tubular) housing 307 upstream. FIG. 4B illustrates a graph of tubing displacement 307 as a function of time.

Figure 5:
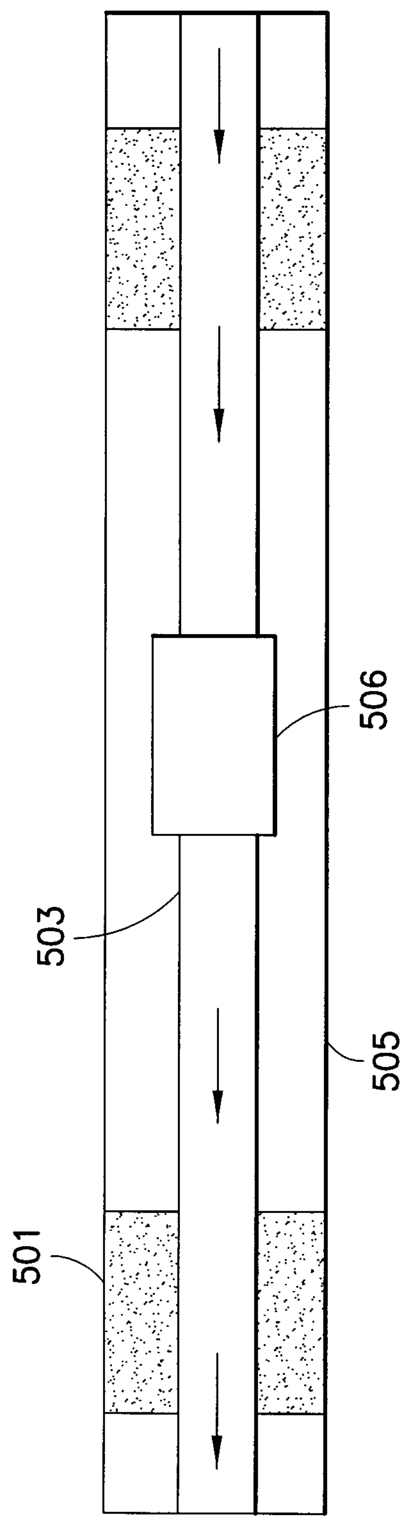
FIG. 5 illustrates a further embodiment of an energy harvesting device.

FIG. 5 illustrates a further embodiment of the present disclosure. The energy harvesting module 506 is disposed along the cylindrical (tubular) housing 503. Flow fluctuations are generally not present at the location of the energy harvesting module 506 in the illustrated figure. Vibrations can be excited by the flow fluctuations from a pump similar to the pump 301. FIG. 5 illustrates a cylindrical (tubular) housing 503 supported on both ends with flow through it. The cylindrical (tubular) housing 503 is anchored to the casing 505 at the two extremes and the cylindrical (tubular) housing 503 vibrates as the fluid flows through it.

A further embodiment of the present disclosure comprises harvesting vibrations which are generated from displacement in the axial direction rather than the lateral direction. As disclosed in application Ser. No. 12/479,308, filed Jun. 5, 2009, entitled "ENERGY HARVESTING FROM FLOW-INDUCED VIBRATIONS", which is herein incorporated by reference, a small obstacle can be placed at the entrance to a production tubing. This obstacle creates shedding of vortexes at a certain frequency.

Figure 6:
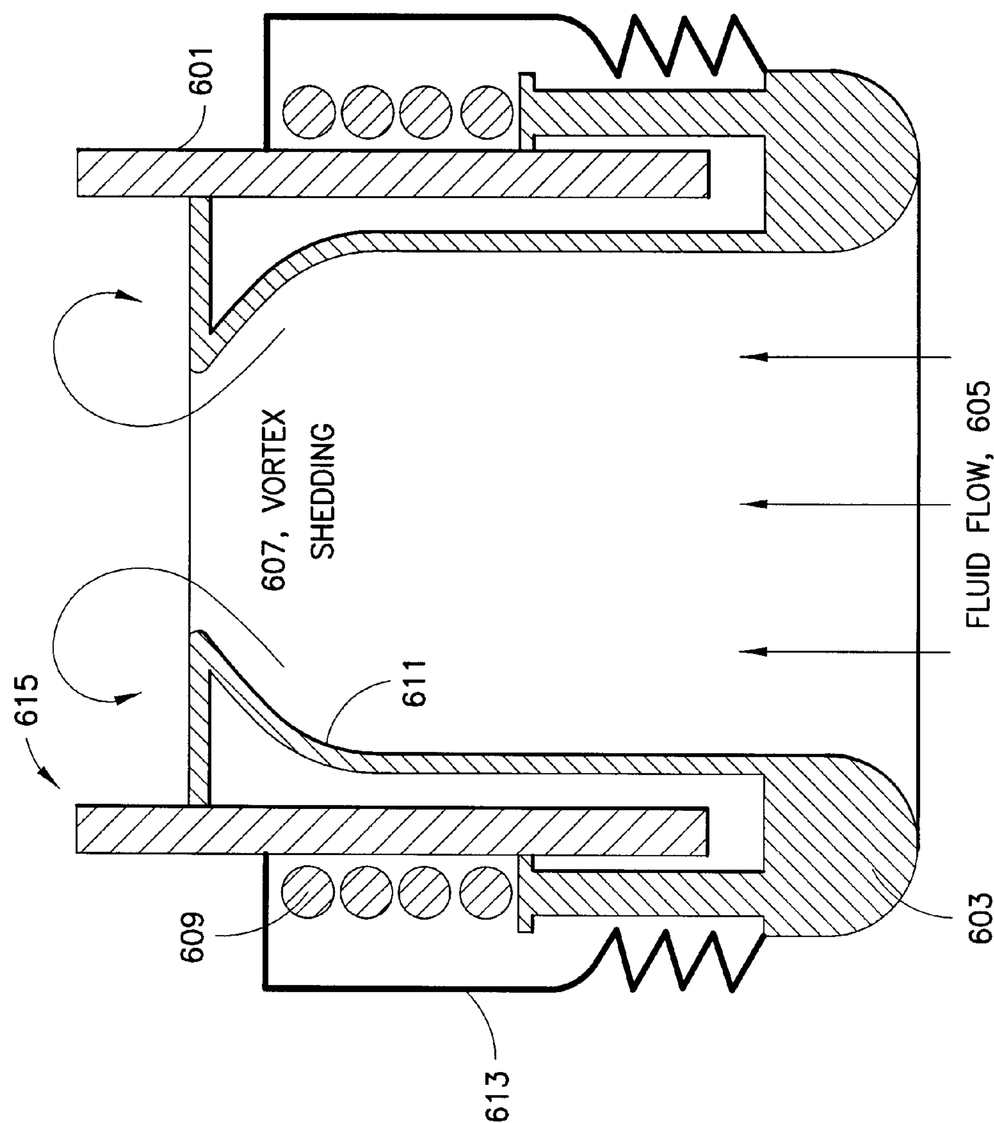
FIG. 6 illustrates a power generating assembly with axial displacement.

FIG. 6 illustrates a power generating assembly 615 which undergoes oscillations due to the induced force from vortex shedding. A mass-spring system 613 is attached to an obstacle 611. The mass 603 of the power generating assembly 615 undergoes oscillations. The mass-spring system which is attached to the obstacle 611 in one non-limiting example has a resonant frequency which matches the vortex shedding frequency. The axial oscillations of the mass-spring system 613 can then be harvested by an energy harvesting module downstream. The displacement of the mass-spring system 613 can be increased by modulating the flow and in one non-limiting example by modulating the flow with a pump similar to pump 301. The frequency of the pump 301 can be modified to match the resonance frequency of the mass-spring system. It is to be clearly understood that principles of the present disclosure may be incorporated in other methods and apparatus to enhance energy production of energy harvesting modules, for example, methods and apparatus of the present disclosure may enhance energy production of energy harvesting modules whose design is based on vibrational energy harvesting.

Figure 7B:
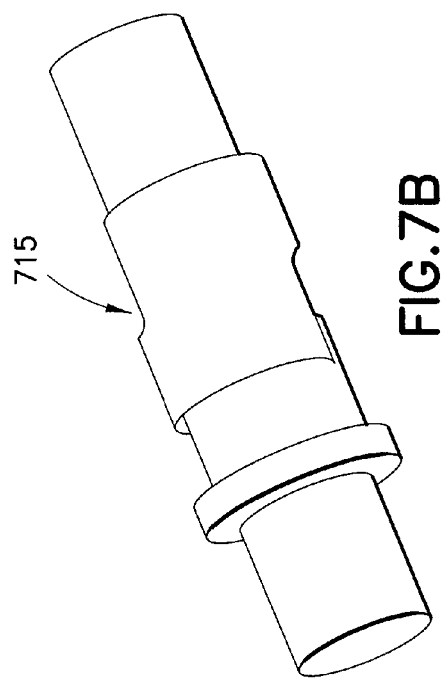
FIG. 7A-7C illustrates a power generating assembly with a vibrating sleeve.
Figure 7C:
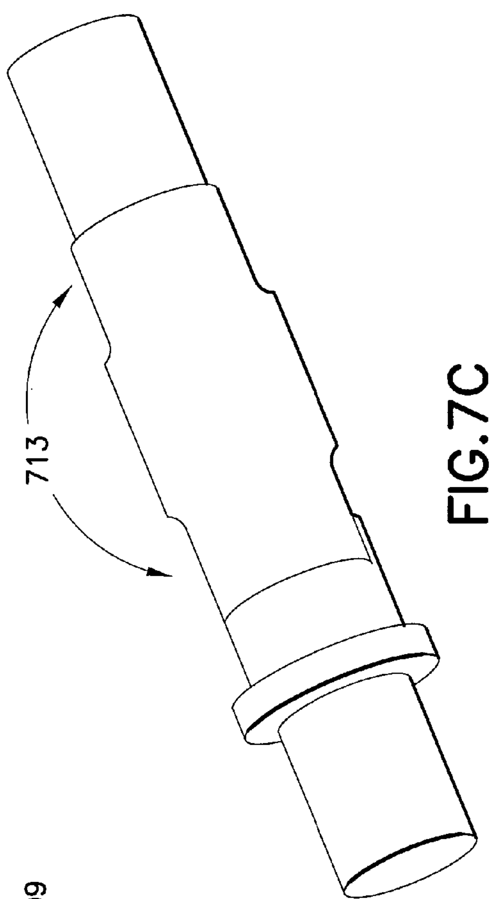
Figure 7A:
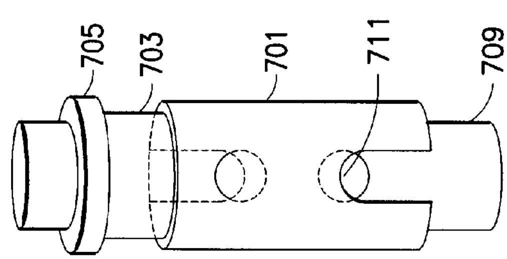

FIG. 7 illustrates a further embodiment of the present disclosure. The vibrating sleeve design was disclosed in application Ser. No. 12/479,308, filed Jun. 5, 2009, entitled "ENERGY HARVESTING FROM FLOW-INDUCED VIBRATIONS", which is herein incorporated by reference. This vibrating sleeve 701 can be placed anywhere along a production tubing 709 and can have in some non-limiting examples two slots which may be aligned or offset or in one other example four slots as illustrated in FIG. 7A-7C. The vibrating sleeve apparatus 701 creates sustainable oscillations by opening and closing access to the production tubing 709 and therefore controlling the pressure drop on opposite sides of the vibrating sleeve apparatus 701. The energy harvesting mechanism is enhanced by flow modulation with the flow fluctuation frequency matching the resonant frequency or frequencies of the vibrating sleeve apparatus 701.

In a further embodiment of the present disclosure a method and apparatus of enhancing the efficiency of energy harvesting modules comprises a plurality of frequencies. A plurality of frequencies can be excited by controlling power to a pump so that specific energy harvesting modules located in geometries that oscillate at different frequencies may oscillate at the same time.

In an alternative embodiment one or more of the plurality of energy harvesting module may be tuned to a different frequency. In a downhole environment power is needed to perform many tasks e.g. provide power to sensors or actuators. The pump may be modulated to match the frequency of a specific harvester module which provides power to a specific sensor or actuator. The advantage of this system is that power is harvested and generated only in the location needed and only when needed therefore modulation of a pump is only intermittent as needed.

In an alternative embodiment a flow restrictor creates flow fluctuations. In one non-limiting example the flow restrictor may be placed upstream or downstream of an electric submersible pump. However, it is to be clearly understood that the flow restrictor may also be used where flow rates are relatively large and no artificial lift system is necessary. In one non-limiting example the flow restrictor may be modulated to an energy harvesting module to create resonance and therefore enhance the efficiency of the energy harvesting module. To avoid a substantial pressure drop across a flow restrictor, in one non-limiting example the flow restrictor restricts only a small percentage of the production tubing area.

The energy harvesting module may harvest energy from the generated vibrations using any standard mass-spring system. In one non limiting example the energy from the vibrations may be harvested by using a mass-flexures system which was disclosed in application Ser. No. 12/366,119, filed Feb. 5, 2009, entitled "ELECTROMAGNETIC DEVICE HAVING COMPACT FLUX PATHS FOR HARVESTING ENERGY FROM VIBRATIONS", which is herein incorporated by reference. To maximize the energy harvested the resonance frequency of the energy harvesting module and the pump modulation frequency can be matched to the system natural frequency.

Figure 8:
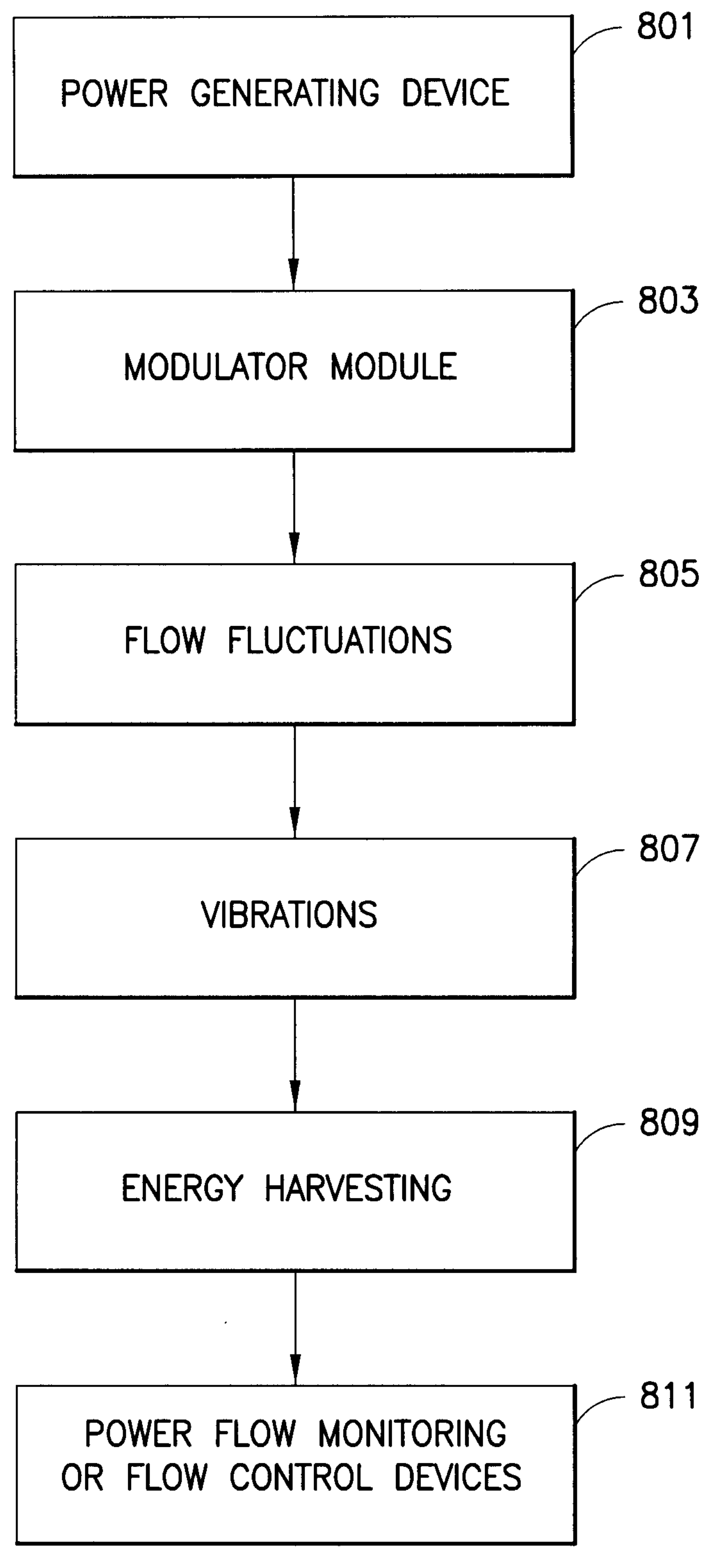
FIG. 8 is a flow chart illustrating an embodiment of the disclosed subject matter.

FIG. 8 illustrates a flowchart of an embodiment of the subject matter disclosed. A power generating module 801 disposed on a production tubing generates vibrations in response to flow fluctuations. A modulator module 803 modulates in one non-limiting example a modulation signal so as to cause flow fluctuations 805 in the producing flow at a predetermined frequency or set of frequencies. The increase in flow fluctuations 805 creates an increase in vibrations 807 of the power generating device 801. This energy is harvested upstream 809 and used to power flow monitoring or flow control devices 811.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Further, the invention has been described with reference to particular preferred embodiments, but variations within the spirit and scope of the invention will occur to those skilled in the art. It is noted that the foregoing examples have been provided merely for the purpose of explanation and are in no way to be construed as limiting of the present invention. While the present invention has been described with reference to exemplary embodiments, it is understood that the words, which have been used herein, are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A method to enhance of enhancing the efficiency of an energy harvesting device comprising the steps of:

generating fluid fluctuations in a fluid flow with a modulator module configured to modulate fluid flow;

with a housing defining an inner volume though which the fluid flow is permitted to traverse from a first opening to a second opening, generating vibrations in the housing from the generated fluid fluctuations; and harvesting energy from the generated vibrations;

wherein the modulator module modulates a power signal to an artificial lift device.

2. The method of claim 1 wherein a frequency of the fluctuations is determined based on a natural frequency of vibrations of the housing.

3. The method of claim 1 wherein a modulation frequency of a modulation signal generated by the modulation module is selected to be substantially equal to an energy harvesting devices resonance frequency.

4. The method of claim 1 wherein a modulation frequency of a modulation signal generated by the modulation module is selected to be substantially equal to the resonance frequency of the vibrations generated by the housing.

5. The method of claim 1 wherein the artificial lift device is an electric submersible pump attached to the housing.

6. The method of claim 1 wherein the energy harvesting device provides power to a flow monitoring module.

7. The method of claim 1 wherein the energy harvesting device provides power to a flow control module.

8. The method of claim 1 wherein the modulated fluid flow is at a predetermined frequency or group of frequencies.

9. The method of claim 8 wherein the predetermined frequency or group of frequencies increases an amplitude of the fluid fluctuations.

10. The method of claim 9 wherein the increase in amplitude of the fluid fluctuations is small enough to minimally affect fluid flow.

11. The method of claim 1 wherein the housing is a production tubing.

12. The method of claim 11 wherein the energy is harvested with one or a plurality of energy harvesting modules disposed on the production tubing.

13. The method of claim 12 wherein the modulator module modulates fluid flow at a predetermined frequency or group of frequencies to match the frequency of one or a plurality of energy harvesting modules.

14. The method of claim 11 wherein the generated vibrations are from structural vibrations of the production tubing.

15. The method of claim 1 wherein the generated vibrations are from vibrating a power generating assembly on the housing in response to the fluid flow through the housing.

16. The method of claim 15 wherein the power generating assembly is a vibrating sleeve.

17. An apparatus for enhancing the efficiency of an energy harvesting device comprising:

a modulator module for generating fluid fluctuations in a fluid flow;

a housing defining an inner volume though which the fluid is permitted to traverse from a first opening to a second opening;

generating vibrations in the housing from the generated fluid fluctuations; and harvesting energy from the generated vibrations;

wherein the modulator module modulates a power signal to an artificial lift device.

18. An apparatus for enhancing the efficiency of an energy harvesting device comprising:

a housing having at least one wall defining an inner volume though which fluid is permitted to traverse from a first opening to a second opening;

means for increasing the instability of said fluid; wherein the housing vibrates from the increased fluid instability; and harvesting energy from the generated vibrations;

wherein the means for increasing the instability of said fluid modulates a power signal to an artificial lift device.

* * * * *